US012066310B2

(12) United States Patent
Li et al.

(10) Patent No.: US 12,066,310 B2
(45) Date of Patent: Aug. 20, 2024

(54) CRUDE OIL FLOW METERING DEVICE

(71) Applicant: Shandong Tiangong Petroleum Equipment Co., Ltd., Jining (CN)

(72) Inventors: Xinhua Li, Jining (CN); Haifeng Tian, Jining (CN); Jianlin Wang, Jining (CN); Hailin Kong, Jining (CN); Dedong Kong, Jining (CN); Guohua Xu, Jining (CN)

(73) Assignee: Shandong Tiangong Petroleum Equipment Co., Ltd., Jining (CN)

( * ) Notice: Subject to any disclaimer, the term of this patent is extended or adjusted under 35 U.S.C. 154(b) by 0 days.

(21) Appl. No.: 17/694,082

(22) Filed: Mar. 14, 2022

(65) Prior Publication Data
US 2023/0003562 A1 Jan. 5, 2023

(30) Foreign Application Priority Data
Jul. 2, 2021 (CN) .......................... 202110748901.9

(51) Int. Cl.
*G01F 1/52* (2006.01)
*G01F 23/30* (2006.01)
(52) U.S. Cl.
CPC ................ *G01F 1/52* (2013.01); *G01F 23/30* (2013.01)
(58) Field of Classification Search
CPC .................................. G01F 1/52; G01F 23/30
(Continued)

(56) References Cited

U.S. PATENT DOCUMENTS 808,562 A * 12/1905 Milton ...................... G01F 1/24
340/870.38
2,388,672 A * 11/1945 Brewer ...................... G01F 1/22
73/861.55
(Continued)

FOREIGN PATENT DOCUMENTS

CN 1306253 C 3/2007
CN 102235903 A 11/2011
(Continued)

OTHER PUBLICATIONS

Stoyanov et al. "Determination of Flow Rate of Different Fluids by a Rotameter" Bulgarian Acadamy of Sciences (Year: 2005).*
(Continued)

*Primary Examiner* — John Fitzgerald
(74) *Attorney, Agent, or Firm* — HSML P.C.

(57) ABSTRACT

The present disclosure relates to a crude oil flow metering device, which includes a measuring part and a metering part; the measuring part includes a measuring tube and a float assembly; the float assembly is in-built in the measuring tube, and includes a float and a float connection rod integrally connected with the float; an end of the float connection rod is connected to a detection part; the detection part protrudes out of the measuring tube when the float rises from a bottom end; the metering part includes a position detection module and a processing module; the position detection module is arranged in a detection cavity located above the measuring tube and formed by a first housing; when the detection part at the end of the float connection rod extends into the detection cavity, the position detection module detects a position of the detection part at the end of the float connection rod to obtain a float height detection signal; and the processing module calculates a flow rate of measured crude oil according to the float height detection signal. The (Continued)

present disclosure can safely meter the crude oil flow of a crude oil transport pipeline and meet the accuracy of metering crude oil.

15 Claims, 9 Drawing Sheets

(58) Field of Classification Search
USPC .................................. 73/861.54–861.57
See application file for complete search history.

(56) References Cited

U.S. PATENT DOCUMENTS

| | | | | |
|---|---|---|---|---|
| 2,425,691 A * | 8/1947 | Brewer | ............ | G01F 1/24 310/104 |
| 2,490,792 A * | 12/1949 | Fischer | ............ | G01F 1/22 73/861.57 |
| 2,552,552 A * | 5/1951 | Head | ............ | G01F 1/24 137/497 |
| 3,024,654 A * | 3/1962 | Head | ............ | G01F 1/22 73/861.57 |
| 3,137,165 A * | 6/1964 | Roy | ............ | G01F 1/24 116/DIG. 42 |
| 3,164,989 A * | 1/1965 | Busillo | ............ | G01F 1/24 73/861.56 |
| 3,182,500 A * | 5/1965 | Ishii | ............ | G01F 1/26 73/861.57 |
| 3,535,932 A * | 10/1970 | Ernest | ............ | G01F 1/24 324/151 R |
| 3,789,664 A * | 2/1974 | Bozek | ............ | G01F 1/22 73/861.58 |
| 3,842,671 A * | 10/1974 | Frizelle | ............ | G01F 1/22 73/861.57 |
| 3,977,248 A * | 8/1976 | Metzger | ............ | G01F 1/24 116/204 |
| 4,059,015 A * | 11/1977 | Satori | ............ | G01F 1/24 340/870.31 |
| 4,195,518 A * | 4/1980 | Fees | ............ | G01F 1/22 116/204 |
| 4,263,813 A * | 4/1981 | Gryn | ............ | G01D 5/06 D15/123 |
| 4,559,834 A * | 12/1985 | Phillips | ............ | G01F 1/22 73/861.55 |
| 4,774,676 A * | 9/1988 | Stenzel | ............ | G01F 15/068 73/296 |
| 5,079,961 A * | 1/1992 | Lew | ............ | G01F 1/24 73/861.56 |
| 5,186,058 A * | 2/1993 | Lew | ............ | G01D 5/165 73/861.56 |
| 5,655,568 A * | 8/1997 | Bhargava | ............ | G05D 7/0146 137/557 |
| 11,319,800 B2 * | 5/2022 | Tian | ............ | E21B 47/12 |
| 11,725,508 B2 * | 8/2023 | Li | ............ | E21B 49/084 73/152.08 |
| 2019/0242242 A1* | 8/2019 | Tian | ............ | E21B 47/10 |

FOREIGN PATENT DOCUMENTS

| | | | |
|---|---|---|---|
| CN | 205537786 U | | 8/2016 |
| CN | 205607459 U | | 9/2016 |
| CN | 211553004 U | | 9/2020 |
| JP | 53006068 A | * | 1/1978 |

OTHER PUBLICATIONS

Turkowski et al. "Minimization of the Settling Time of Variable Area Flow Meters" Sensors 2019, 19, 530 (Year: 2019).*

Zhang "New Flow Equation for Rotameter" National Natural Science Foundation of China No. 511790079 (Year: 2012).*

* cited by examiner

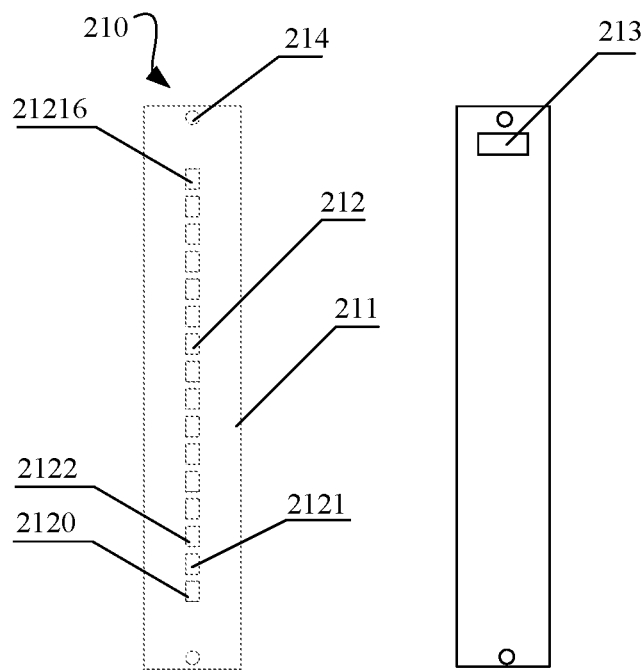
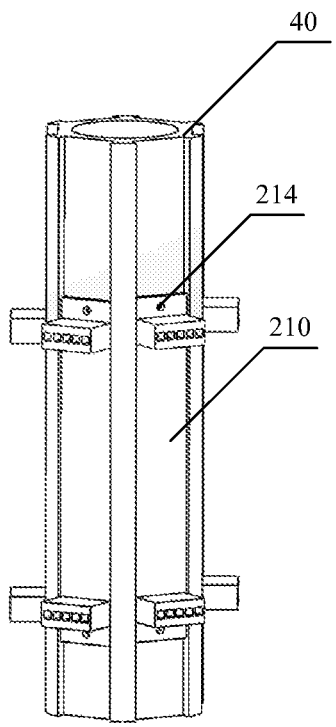
FIG. 5A  FIG. 5B  FIG. 5C
FIG. 6

CRUDE OIL FLOW METERING DEVICE

FIELD OF THE INVENTION

The present disclosure relates to a metering device, in particular to a crude oil flow metering device applied in the petroleum field.

BACKGROUND OF THE INVENTION

In the process of oil production, a ground oil extraction apparatus, such as an oil pumping unit, extracts a mixed liquid (hereinafter referred to as crude oil) of oil, gas and water from the formation, which is then transported through a ground pipeline to crude oil processing plants for processing or transported to oil storage tanks for temporarily storage. In order to know about the yield of oil wells, it is necessary to use relevant equipment to meter the yield of oil wells. In theory, flowmeters such as vortex flowmeters, ultrasonic flowmeters, and metal float flowmeters can be installed in the oil transport pipeline to measure the flow rate of crude oil, and then the yield of the oil wells can be obtained through conversion. However, in practical applications, flowing characteristics of the crude oil in the ground pipeline of oil wells are closely related to the way the liquid comes out of the oil wells. The working process of the oil extraction apparatus includes two strokes, i.e., an upward stroke and a downward stroke. During the upward stroke, the crude oil flows out to the ground pipeline through a sucker rod. During the downward stroke, there is basically no crude oil flowing out, so the liquid in the ground pipeline of the oil well will flow stream by stream. In addition, the unprocessed crude oil itself that has just been mined has a complex composition. It is a mixed liquid that integrates oil, gas, water, various other liquid components, and solid particles, which is viscous and has poor fluidity. The liquid will also entrain agglomerated oil mass. If devices such as the above-mentioned vortex flowmeter, ultrasonic flowmeter, turbine flowmeter, and metal float flowmeter are used to measure the flow rate in the ground pipeline of the oil well, first, due to the unique way of discharging liquid of the oil well, the metering error will be too large and the accuracy requirements cannot be met. In addition, due to the liquid properties of the crude oil, a measuring tube of the flowmeter will be easily blocked, which not only makes it impossible to measure, but also easily causes the pressure in the pipeline to rise and burst the pipeline, thereby leading to safety accidents such as oil leakage and pipeline burst. Therefore, there is an urgent need for a flow metering device that is safe, convenient to install, and meets the accuracy requirements.

SUMMARY OF THE INVENTION

In view of the technical problem existing in the prior art, the present disclosure proposes a crude oil flow metering device, which can safely meter the crude oil flow rate of a crude oil transport pipeline and meet the accuracy of metering the crude oil.

In order to solve the above technical problem, the present disclosure provides a crude oil flow metering device, which includes a measuring part and a metering part; the measuring part includes a measuring tube and a float assembly; the measuring tube includes a liquid inlet and a liquid outlet; an inner diameter of the measuring tube gradually increases from the liquid inlet to the liquid outlet; the float assembly is in-built in the measuring tube, and includes a float and a float connection rod integrally connected with the float; an end of the float connection rod is connected to a detection part; the detection part protrudes out of the measuring tube when the float rises from a bottom end; the metering part includes a position detection module and a processing module; the position detection module is arranged in a detection cavity located above the measuring tube and formed by a first housing; when the detection part at the end of the float connection rod extends into the detection cavity, the position detection module detects a position of the detection part at the end of the float connection rod to obtain a float height detection signal; and the processing module is connected to the position detection module to calculate a flow rate of measured crude oil according to the float height detection signal.

In a case where the float in the device is a sphere, the processing module calculates the flow rate of the measured crude oil according to formula 1-5:

$$q_v = \alpha [\pi(R_f + \Delta h \sin(\theta/2))^2 - \pi R_f^2] \sqrt{2gV_f(\rho_f - \rho)/\rho \pi R_f^2}; \quad 1\text{-}5$$

where $q_v$ is a volumetric flow, $\alpha$ is a flow coefficient of the device, g is the acceleration of gravity, $V_f$ is a volume of the sphere float, $\rho_f$ is a density of the material of the sphere float, $\rho$ is a density of the measured crude oil, $\theta$ is a cone angle of the measuring tube, $\Delta h$ is a height of the sphere float from its lowest point to a current measurement position, and $R_f$ is a radius of the sphere float.

In a case where the float of the crude oil flow metering device is a structural body which has a circular working cross section and which is symmetrical with respect to a vertical centerline, the processing module calculates the flow rate of the measured crude oil according to formula 1-8:

$$q_v = \alpha [\pi(R_f + \Delta h \tan(\theta/2))^2 - \pi R_f^2] \sqrt{2gV_f(\rho_f - \rho)/\rho \pi R_f^2}; \quad 1\text{-}8$$

where $q_v$ is a volumetric flow, $\alpha$ is a flow coefficient of the device, g is the acceleration of gravity, $V_f$ is a volume of the float, $\rho_f$ is a density of the material of the float, $\rho$ is a density of the measured crude oil, $\theta$ is a cone angle of the measuring tube, $\Delta h$ is a height of the float from its lowest point to a current measurement position, and $R_f$ is a maximum working radius of the float.

During the flow of the measured crude oil from the liquid inlet to the liquid outlet of the measuring tube, the float in the present disclosure can overcome the resistance generated by the viscosity of the crude oil and, in accordance with the flowing pattern (i.e., the crude oil flows stream by stream), rises, stabilizes at a certain height, falls, rises again, stabilizes at a certain height, and falls again, etc. The float can also stabilize at different heights according to the magnitude of the flow rate when the crude oil flows continuously. Therefore, the flow metering device provided by the present disclosure can be well adapted to the flowing characteristics of the crude oil and the liquid properties of the crude oil. In addition, transmission mechanisms in the traditional float flowmeters are not used in the present disclosure, so the present disclosure is not subjected to the fatigue damage of the traditional float detection assembly, and the reliability and accuracy of the device for long-term metering can be ensured.

BRIEF DESCRIPTION OF THE DRAWINGS

Hereinafter, preferred embodiments of the present disclosure will be described in further detail with reference to the accompanying drawings, in which:

FIGS. 5A-5C are schematic views of a Hall sensor array in a metering part according to an embodiment of the present disclosure;

FIG. 6 is a schematic view of an overall structure of the Hall sensor array in the metering part according to another embodiment of the present disclosure;

DETAILED DESCRIPTION OF THE EMBODIMENT(S) OF THE INVENTION

Figure 1:
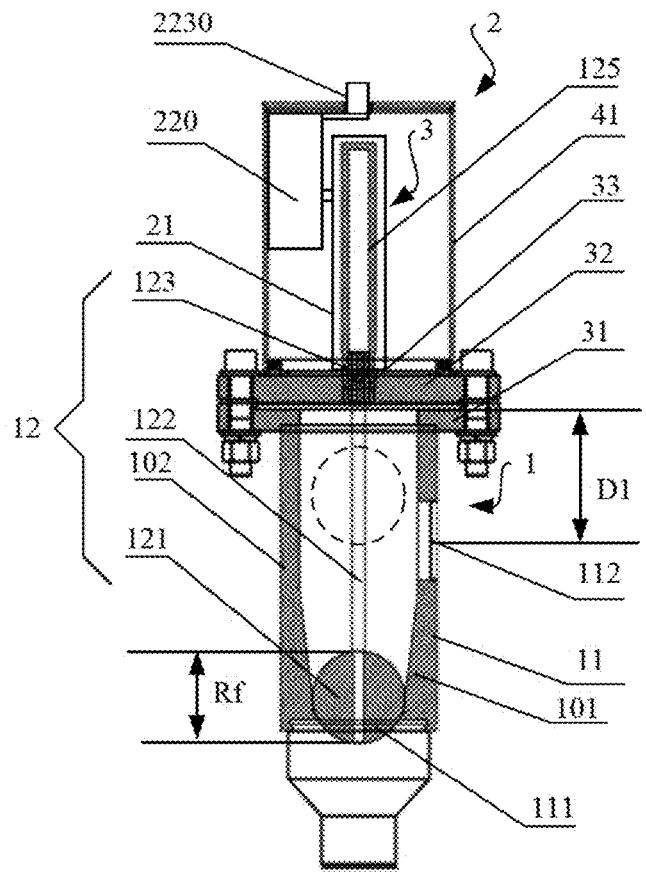
FIG. 1 shows a partial structure of a crude oil flow metering device according to an embodiment of the present disclosure.

In order that the objects, technical solutions and advantages of the embodiments of the present disclosure will become clearer, technical solutions in the embodiments of the present disclosure will be described clearly and completely below in conjunction with the drawings in the embodiments of the present disclosure. Apparently, the described embodiments are some of the embodiments of the present disclosure, not all of them. All the other embodiments obtained by those skilled in the art based on the embodiments of the present disclosure without creative efforts will fall within the scope of protection of the present disclosure.

In the following detailed description, reference may be made to various drawings which constitute a part of the present application and which serve to explain specific embodiments of the present application. In the drawings, similar reference signs denote substantially similar components in different figures. The individual specific embodiments of the present application will be described in sufficient detail below to enable those of ordinary knowledge and skills in the art to carry out the technical solutions of the present application. It is understood that other embodiments may be utilized, or structural, logical or electrical changes may be made to the embodiments of the present application.

The present disclosure provides a crude oil flow metering device, which determines a rising height of a float in a measuring tube by detecting a position of a detection part 3 on a float connection rod, thereby calculating a flow rate of measured crude oil. Out of the existing flow metering devices, the float type flowmeter is a widely used device for metering the flow rate of gas and liquid. Metering elements of the float type flowmeter include a measuring tube and an indicator. An interior of the measuring tube is a cone-shaped measuring chamber that gradually expands from bottom to top, with a fluid inlet at a lower end and a fluid outlet at an upper end. A float, which is guided by a guide rod and can move up and down freely, is in-built in the cone-shaped measuring chamber. When the measured fluid flows through the cone-shaped measuring tube from bottom to top, a differential pressure is generated between upper and lower ends of the float to form a rising force. When the rising force acting on the float is greater than the weight of the float immersed in the fluid, the float will rise, and the area of the annular gap between the float and a wall of the measuring tube will increase accordingly; a flow velocity of the fluid at the annular gap decreases immediately, the differential pressure between the upper and lower ends of the float decreases, and the rising force acting on the float also decreases until the rising force equals to the weight of the float immersed in the fluid, at which time the float stabilizes at a certain height, and the area of the annular gap between the float and the wall of the measuring tube remains constant. The area of the annular gap and the rising height of the float have a certain correspondence, that is, a rising position of the float in the measuring tube can represent the magnitude of the flow rate. There are usually two types of indicators. One type is to set scales on a tube body, and a value of the scale is determined according to a correspondence between the position and the flow rate. In this type of flowmeter, the flow rate value can be obtained by observing the scale position where the liquid is located. Another type of indicator is a pointer indicator. In this type of flowmeter, the float is in-built with a first steel magnet, the indicator is in-built with a second steel magnet coupled with the first steel magnet, and the second steel magnet is connected to a pointer through a transmission mechanism such as a connection rod. When the float moves up and down and rotates with the measured fluid, a magnetic field generated by the first magnetic steel in-built in the float changes with the movement and rotation of the float. Since the second steel magnet in the indicator is magnetically coupled with the first steel magnet, the second steel magnet rotates with the change of the magnetic field, and the second magnet drives the pointer of the indicator to rotate through the connection rod which serves as the transmission mechanism. After correction, the rising height of the float corresponds to the position of the pointer in a one-to-one correspondence, and the position of the pointer indicates the corresponding flow rate. However, after long-term use of the above-mentioned metal float type flowmeter, due to the limitations of processing and material conditions, the connection rod in the transmission mechanism will not be able to accurately transmit the position of the float due to the fatigue damage suffered, thus resulting in inaccurate measurement and deterioration of the reliability after long-term use. No transmission mechanism is used in the present disclosure, so the present disclosure is not subjected to the fatigue damage of the traditional float position detection assembly, and the accuracy during long-term use can be ensured. In addition, traditional floats have a relatively small weight and cannot adapt to such viscous fluids as crude oil which has a complex composition. Although the present disclosure is very similar to the traditional float type flowmeters in some structures, in order to adapt to the special flowing state and fluid composition of the crude oil, the structure of the present disclosure is significantly different from the traditional float type flowmeters. Hereinafter, the present disclosure will be described in detail through specific embodiments as follows.

FIG. 1 shows a partial structure of a crude oil flow metering device according to an embodiment of the present disclosure. In this embodiment, the sensor is a Hall sensor, and the corresponding detection part 3 at the end of the float connection rod is a magnet. With reference to FIG. 1, the crude oil flow metering device includes a measuring part 1 and a metering part 2. The measuring part 1 includes a measuring tube 11 which includes a liquid inlet 111 and a liquid outlet 112, and the measuring tube 11 includes a straight tube 101 and an inverted cone-shaped tube 102 that are sleeved together. A bottom of the cone-shaped tube 102 is the liquid inlet 111, and the liquid outlet 112 is arranged on a side wall of the straight tube 101. An inner diameter of the entire measuring tube 11 gradually increases from the liquid inlet 111 to the liquid outlet 112. By changing the different cone angles of the cone-shaped tube 102, the cone-shaped tube 102 can be adapted to the measured petroleum with different flow rates. If the flow rate is large, a large cone angle is used, and if the flow rate is small, a small cone angle is used. It has been proven from experience that when the cone-shaped tube 102 adopts a cone angle of no larger than 20 degrees, the accuracy requirements can be well met when metering a certain range of flow rate. In the present disclosure, the cone-shaped tube 102 and the straight tube 101 are movably nested into each other, and the cone-shaped tubes 102 with different cone angles can be selected to match with the straight tube 101 according to the flow rate in the currently measured oil pipeline.

In some embodiments, a distance between the liquid outlet and a top end of the measuring tube is not less than a maximum working distance of the float in a vertical direction. As shown in FIG. 1, the distance D1 between the liquid outlet 112 and the top end of the measuring tube, that is, a lower surface of an upper flange, is not less than a diameter Rf of the sphere float 121. In a case where the measured petroleum fluid includes agglomerated oil mass, when it enters the measuring tube 11, even if it cannot immediately flow out of the measuring tube 11 through the liquid outlet 112, the sphere float 121 will rise upward when the flow rate of the liquid is large enough, thereby creating a liquid flow channel, so that the liquid can flow out of the measuring tube through the liquid outlet 112 without being retained in the measuring tube for a long time to block the measuring tube.

A float assembly 12 is in-built in the measuring tube 11, and the float assembly includes a float 121 and a float connection rod 122 integrally connected with the float 121. The float 121 in this embodiment is a solid metal sphere, such as a stainless steel sphere with a density of 7.8 kg/m$^3$ and a diameter larger than the liquid inlet 111. Therefore, as compared with the floats in the existing float type flowmeters, the float 121 in this embodiment has a heavier weight and can be well adapted to a flowing environment with poor fluidity caused by the viscosity of the crude oil.

An end of the float connection rod 122 is provided with an installation groove, and the magnet 123 is installed in the installation groove by a necking riveting method. When the float connection rod 122 moves up and down, it can be sensed by the Hall sensor when it reaches a sensing point of the Hall sensor. The magnet 123 in the present disclosure may be a permanent magnet with strong magnetism, such as a neodymium-iron-boron magnet, a samarium-cobalt magnet, an alnico magnet and the like.

Figure 2:
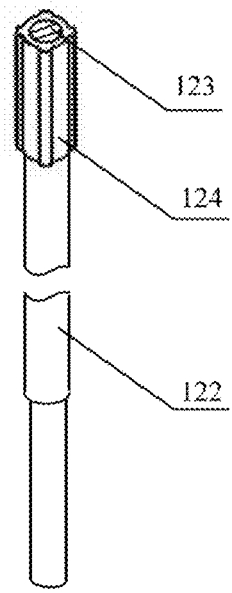
FIG. 2 is a schematic view of a float connection rod according to an embodiment of the present disclosure.

When the float moves along a movement path in the vertical direction, in order to make the float upright, a float stabilizing structure 124 is connected to the end of the float connection rod 122 in a better embodiment. As shown in FIG. 2, the float stabilizing structure 124 includes a column and a plurality of side edges protruding from a side surface of the column in an axial direction of the column. In this embodiment, there are four side edges in total, and when viewed from the cross section of the column, the four side edges constitute a cross structure. The installation groove of the magnet 123 may be arranged on the column of the float stabilizing structure 124. The other end of the float connection rod 122 is embedded in a central groove of the float 121 so as to be integrally connected with the float.

The top end of the measuring tube 11 is connected with a lower flange 31, and the lower flange 31 has a through hole with the same inner diameter as the straight tube 101 in the measuring tube 11. A sealing gasket, a sealing ring and the like are arranged between the upper flange 32 and the lower flange 31 so that the upper flange 32 and the lower flange 31 are sealedly connected. A fixing base is fixed on the upper flange 32, and a housing 41 is fixed on the fixing base, thereby forming a detection cavity to protect an internal position detection element. A conduit 33 is provided at the center of the upper flange 32; for example, the conduit 33 is a metal tube, which is sealedly connected to the upper flange 32, and which is sealedly connected to an open end of a connection rod sleeve 125. The float connection rod 122 can freely and vertically pass through the conduit 33 and extend into the connection rod sleeve 125. When the float connection rod 122 is located in the connection rod sleeve 125, the cross structure at the end of the float rod can make the float connection rod 122 upright so that the float and the float connection rod 122 move in the vertical direction. In addition, the cross structure at the end of the float rod can effectively reduce a contact area between the float connection rod 122 and an inner wall of the connection rod sleeve 125, thereby reducing the friction between the float connection rod 122 and the inner wall of the connection rod sleeve 125 when the float connection rod 122 moves up and down. At the same time, a negative pressure can also be prevented from being generated when there is water and oil in the connection rod sleeve 125, which would otherwise suction the float connection rod 122 and cause the float connection rod 122 to fail to fall back into the measuring tube normally.

In this embodiment, the metering part 2 includes a position detection module and a processing module, and the position detection module is located in the detection cavity formed by the housing 41. In this embodiment, the position detection module includes a sensor array 21, which is arranged on a sleeve (it can be known that the sleeve may be an independent component; or as shown in the figure, it may also be the connection rod sleeve 125). A bottom of the sleeve is fixedly connected to the upper flange 32, the sensor array 21 composed of a plurality of Hall sensors is arranged on an outer surface of the sleeve, and the plurality of Hall sensors are arranged in the up-and-down vertical movement direction of the float connection rod, and are located in a moving range of the magnet 123 at the end of the float connection rod. The processing module is connected to a signal output terminal of the sensor array 21, and calculates the flow rate of the measured crude oil according to received Hall sensor data.

Figure 3:
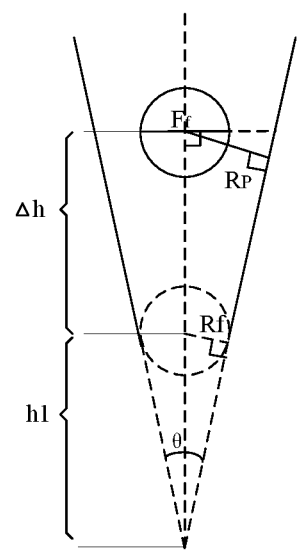
FIG. 3 is a schematic diagram of a calculation principle of the crude oil flow metering device when the float is a sphere float according to an embodiment of the present disclosure.

As shown in FIG. 3, a schematic diagram of a calculation principle of the crude oil flow metering device when the float is a sphere float is illustrated. It is a partial schematic view of an axial section of the measuring tube. The measuring tube has a cone shape. When the float is not rising, it is located at the bottom of the cone-shaped measuring tube, and a distance from the float to a top point of the cone-shaped measuring tube is h1. The float moves upward under the action of the measured crude oil. When the float is subjected to balanced forces in the measuring tube, it stabilizes at a height, and the rising height of the float at this time is Δh. The volumetric flow calculation formula 1-1 of the crude oil flow metering device is:

$$q_v = \alpha \varepsilon \Delta F \sqrt{\frac{2gV_f(\rho_f - \rho)}{\rho F_f}} ; \qquad 1-1$$

where $q_v$ is a volumetric flow, $\alpha$ is a flow coefficient of the device, $\varepsilon$ is a gas expansion coefficient when the measured fluid is a gas (the present disclosure is used for crude oil metering, and the crude oil is an incompressible fluid, of which $\varepsilon=1$), g is the acceleration of gravity, $V_f$ is a volume of the float or the sphere float, $\rho_f$ is a density of the material of the float, $\rho$ is a density of the measured crude oil, $F_f$ is a cross-sectional area of the float at the maximum working position, $\Delta F$ is a circulation annular area, $\theta$ is a cone angle of the measuring tube, and $\Delta h$ is a rising height of the float from its lowest point to a current measurement position.

When the float is a sphere, $R_f$ is a radius of the sphere float; Rp is a corresponding working radius of the measuring tube at the position where the float is located:

where $Rp=(R_f+\Delta h \sin(\theta/2))$ \qquad 1-2

$\Delta F=\pi Rp^2-F_f$ \qquad 1-3

$F_f=\pi R_f^2$ \qquad 1-4.

By substituting the above three formulas into formula 1-1, the following formula 1-5 is obtained:

$$q_v = \alpha\left[\pi(R_f + \Delta h\sin(\theta/2))^2 - \pi R_f^2\right]\sqrt{2gV_f(\rho_f - \rho)/\rho\pi R_f^2} . \qquad 1-5$$

In formula 1-5, except for the height Δh of the float from its lowest point to the current measurement position, all other parameters are known parameters. When the value of the rising height Δh of the float is sensed by the sensor, the instantaneous flow rate of the measured crude oil can be calculated through formula 1-5, and a cumulative flow rate for a period of time can be obtained through the following formula 1-6:

$$Q_t = Q_0 + \int_0^t q_t dt \qquad 1-6;$$

where $Q_t$ represents the cumulative flow rate at time t, $Q_0$ represents the cumulative flow rate at time t=0, $q_t$ represents the instantaneous flow rate at time t, and t represents time (the unit being s).

In addition to the spherical shape, the float in the present disclosure may also be any structural body which has a circular working cross section and which is symmetrical with respect to a vertical centerline, such as a cylinder, a cone, an ellipsoid, a sphere, etc.; or the float may be any structural body obtained after a combination of the above various shapes so that the float can be subjected to uniform forces in all directions and can move up and down stably in the measured crude oil. The float in this embodiment is a sphere, and the contact between the sphere float and the inner wall of the measuring tube 11 is line contact. As compared with other shapes, firstly, the friction generated when the sphere float is in contact with the inner wall of the measuring tube can be ignored, thus simplifying the force application condition on the sphere float and making the calculation process more accurate so that the accuracy of the measurement is improved; secondly, when the measured fluid is a liquid having a certain viscosity, such as the crude oil, the curved surface of the float is advantageous for reducing the impedance of the viscous liquid to the up-and-down movement of the float in the liquid.

Figure 4:
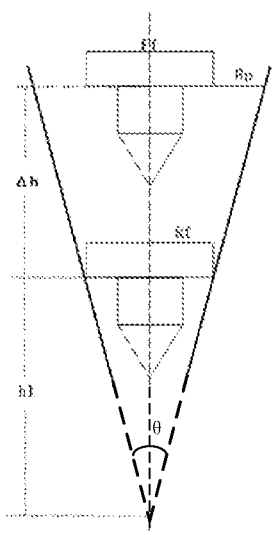
FIG. 4 is a schematic diagram of the calculation principle of the crude oil flow metering device when the float is a gyroscopic float according to an embodiment of the present disclosure.

As shown in FIG. 4, a schematic diagram of the calculation principle of the crude oil flow metering device when the float is a gyroscopic float is illustrated. In a case where the float is gyroscopic, when it is impacted by a large flow of fluid, its own rotation reduces the swinging in the lateral direction, so that it can move up and down stably in the vertical direction. FIG. 4 is a partial schematic view of an axial section of the measuring tube. The volumetric flow calculation formula 1-1 of the crude oil flow metering device is:

$$q_v = \alpha \varepsilon \Delta F \sqrt{\frac{2gV_f(\rho_f - \rho)}{\rho F_f}} ; \qquad 1-1$$

where $q_v$ is a volumetric flow, $\alpha$ is a flow coefficient of the flowmeter, $\varepsilon$ is a gas expansion coefficient when the measured fluid is a gas (the present disclosure is used for crude oil metering, and the crude oil is an incompressible fluid, of which $\varepsilon=1$), g is the acceleration of gravity, $V_f$ is a volume of the float, $\rho_f$ is a density of the material of the float, $\rho$ is a density of the measured crude oil, $F_f$ is a maximum cross-sectional area of the float, $\Delta F$ is a circulation annular area, $\theta$ is a cone angle of the measuring tube, $\Delta h$ is a height of the float from its lowest point to a current measurement position, Rp is a corresponding working radius of the measuring tube at the position where the float is located, and $R_f$ is a working radius of the float;

where $Rp=(Rf+\Delta h \tan(\theta/2))$ \qquad 1-7

$\Delta F=\pi Rp^2-F_f$ \qquad 1-3

$F_f=\pi R_f^2$ \qquad 1-4.

By substituting the above three formulas into formula 1-1, the following formula 1-8 is obtained:

$$q_v = \alpha\left[\pi(R_f + \Delta h\tan(\theta/2))^2 - \pi R_f^2\right]\sqrt{2gV_f(\rho_f - \rho)/\rho\pi R_f^2} . \qquad 1-8$$

In formula 1-8, except for the height Δh of the float from its lowest point to the current measurement position, all other parameters are known parameters. When the value of the rising height Δh of the float is sensed by the sensor, the instantaneous flow rate of the measured crude oil can be calculated through formula 1-8, and a cumulative flow rate for a period of time can be obtained through the above formula 1-6.

FIGS. 5A-5C are schematic views of a sensor array in a metering part 2 according to an embodiment of the present disclosure. In this embodiment, a first sensor array 210 includes a chip board 211 on which a plurality of Hall sensors 212 are evenly arranged, and the arrangement direction thereof is the same as the up-and-down movement direction of the float connection rod 122, that is, the Hall sensors 212 are arranged vertically. Signal sockets 213 are provided on a back side of the chip board 211, and the chip board 211 is a circuit board, such as a printed circuit board, on which conductive strips corresponding to a plurality of pins of the Hall sensors 212 are printed; the pins of the plurality of Hall sensors 212 are respectively connected to the corresponding conductive strips on the circuit board, and each interface of the signal sockets 213 is respectively connected to the corresponding conductive strip. For example, the pins of the Hall sensors 212 correspond to power supply positive pin, ground pin, clock pin, latch pin, data pin and the like respectively. Therefore, the chip board 211 has five corresponding conductive strips in total, and the signal sockets 213 have five interfaces in total, which are connected to the corresponding conductive strips respectively. Both ends of the chip board 211 are respectively provided with fixing holes 214 to facilitate fixing the chip board 211 on the relevant support or bracket.

Each Hall sensor 212 on the chip board 211 has a unique position and corresponds to the rising height of the float in the measuring tube in a one-to-one correspondence. For example, the lowermost Hall sensor 2120 on the chip board 211 corresponds to the position of the float at the bottom of the measuring tube when the float is not rising; that is, at this time, the rising height of the float corresponding to the Hall sensor 2120 in the measuring tube is 0, the rising height of the float corresponding to the Hall sensor 2121 in the measuring tube is 2 mm, the rising height of the float corresponding to the Hall sensor 2122 in the measuring tube is 4 mm . . . and so on, and the rising height of the float corresponding to the uppermost Hall sensor 21216 on the chip board 211 in the measuring tube is 30 mm. Therefore, it can be seen that the total sensing height of the sensor array formed by the plurality of Hall sensors 2121-21216 on the chip board 211 is 30 mm. Therefore, the present disclosure sets position information for each Hall sensor in the first sensor array 210. For example, the Hall sensors are numbered 0000, 0001, 0002 . . . 0015 in sequence from bottom to top, and a table of the correspondence between the sensor position information and the height is stored. When the first sensor array 210 sends sensor data, each sensor data includes not only voltage information sensed by the Hall sensor, i.e., data information, but also the position information of the sensor that sends the data information. The position information can be represented by its number, so that when the processing module analyzes the sensor data, the corresponding position is determined according to the sensor number in the sensor data, thereby determining the rising height of the float in the measuring tube.

During the metering process, when the measured petroleum fluid enters the measuring tube from the liquid inlet at the bottom, the float 121 moves upward since the float overall is subjected to an upward force, and the magnet 123 at the end of the float connection rod 122 rises accordingly. When the magnet 123 passes through the hall sensor 212 in the first sensor array 210, the magnetic field of the magnet 123 is applied to the hall sensor 212, and the hall sensor 212 generates an electrical signal. The Hall sensor 212 composes the generated electrical signal and its position information into sensor data, and outputs the sensor data through a signal output terminal of the first sensor array 210. The processing module periodically collects the signal output terminal of the first sensor array 210. When the sensor data is collected, by identifying the position information in the sensor data, the position of the Hall sensor that generates the electrical signal in the sensor data can be determined. Then, the rising height of the magnet 123 in the measuring tube can be determined by querying the table of the correspondence between the position and the height, so that the instantaneous flow rate of the measured crude oil can be calculated through formula 1-5.

FIG. 6 is a schematic view of an overall structure of the sensor array in the metering part 2 according to another embodiment of the present disclosure. In this embodiment, the Hall sensor array 21 includes six first sensor arrays 210 shown in FIG. 5. In an embodiment, the six first sensor arrays 210 are fixed on an outer surface of a side surface of a first sensor sleeve 40, and are arranged in a spirally ascending manner in a circumferential direction of the first sensor sleeve 40. An end of the first sensor sleeve 40 and the upper flange 32 are fixed together, and the chip board on which the Hall sensors 212 are arranged faces the interior of the first sensor sleeve 40. A connection rod sleeve 125 is sleeved inside the first sensor sleeve 40, and the connection rod sleeve 125 is sealedly connected with the conduit 33 in the upper flange. The end of the float connection rod 122 enters the connection rod sleeve 125 through the conduit 33, and moves therein freely up and down with the measured crude oil. In some other embodiments, the six first sensor arrays 210 can be adhered on the outer surface of the connection rod sleeve 125, and the connection rod sleeve 125 is used as a support structure.

Figure 7:
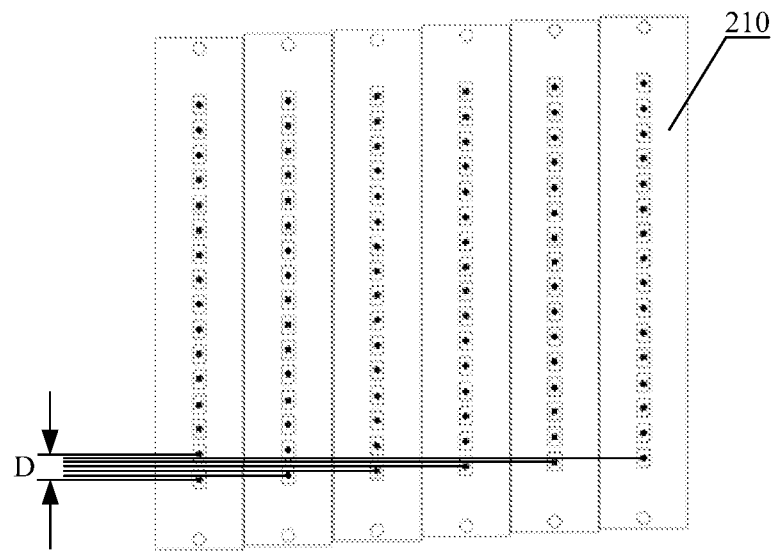
FIG. 7 is a schematic view of six Hall sensor arrays in FIG. 6 after being expanded.

In this embodiment, the plurality of first sensor arrays 210 are arranged in a spirally ascending manner on the first sensor sleeve 40 in the up-and-down movement direction of the float connection rod, and the signal sockets 213 of the plurality of first sensor arrays 210 are sequentially connected in series. Reference is made to FIG. 7, which is a schematic view of the six first sensor arrays 210 in FIG. 6 after being expanded. It can be seen from FIG. 7 that the sensing points of two adjacent Hall sensors in each first sensor array 210 are separated by a distance d=D. Through the other five first sensor arrays 210 arranged in a spirally ascending manner, the sensing distance D in one first sensor array 210 can be equally divided into six parts, that is, the sensing distance of two adjacent Hall sensors of the current Hall sensor array is d=D/6. Therefore, the detection accuracy of the sensor arrays in this embodiment is improved by 6 times as compared with only one first sensor array 210. By setting the distance d between two adjacent Hall sensors in one first sensor array 210 and the number of the first sensor arrays 210, sensing distances with different accuracies can be obtained. The accuracy of the sensing distance corresponds to the metering accuracy of the rising height of the float. A distance from the sensing point of the lowermost sensor to the sensing point of the uppermost sensor constitutes the total sensing height $h_T$ of the sensor array 21 in this embodiment, and the corresponding total sensing height $h_T$ is set according to the actual measurement range in the application scene.

Similarly, in this embodiment, each sensor has unique position information. For example, a four-digit number is used to represent the position information of a sensor, in which the first two digits represent the numbering of the first sensor array, and the last two digits represent the numbering of the position arranged vertically in the first sensor array. For example, the sensor with position information of 0210 is the $10^{th}$ sensor in the second first sensor array.

The processing module 22 in the metering part 2 can be arranged in the detection cavity formed by the housing 41 (see FIG. 1) as actually required, or the processing module 22 is located in another second housing. The second housing is made into a gauge outfit as required, which is in communication with the housing 41 to connect to the signal output terminal of the sensor array 21 in the housing 41.

Figure 8:
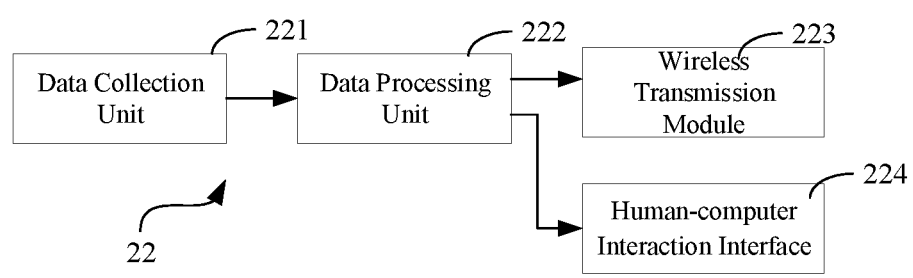
FIG. 8 is a block diagram of the principle of a processing module according to an embodiment of the present disclosure.

FIG. 8 is a block diagram of the principle of a processing module according to an embodiment of the present disclosure. The processing module 22 includes a data collection unit 221, a data processing unit 222, and a wireless transmission module 223. Correspondingly, the processing module 22 may be located inside the detection cavity formed by the housing 41, and an antenna of the wireless transmission module 223 is placed outside the housing 41 through a provided through hole or window to transmit and receive wireless signals, as shown in FIG. 1. A sealing device, such as a sealing strip, sealant, etc., is provided between the through hole or window and the housing 41. The data collection unit 221, the data processing unit 222, the wireless transmission module 223 and the like are placed on the circuit board and fixed at proper positions inside the housing 41. As shown in FIG. 1, the circuit board 220 is fixed at the top of the housing 41, and the antenna 2230 protrudes out of the through hole at the top of the housing. The data collection unit 221 on the circuit board 220 is connected to the signal interface of the sensor array 21, and collects sensor signals of the sensor array 21 according to a preset collection period to obtain sensor data. The data processing unit 222 is connected to the data collection unit 221 to process the sensor data and calculate the flow rate of the measured crude oil fluid. The wireless transmission module 223 of the present disclosure is connected to the data processing unit 222, and is configured to establish a wireless connection with an external legal apparatus, output the flow rate data of the measured crude oil to the legal apparatus, and receive instructions, data and the like from the legal apparatus to be sent to the data processing unit 222. For example, when the measured crude oil fluid changes, the external legal apparatus will wirelessly send new parameters of the measured crude oil fluid to the device, and the wireless transmission module 223 will receive the new parameters of the measured crude oil fluid and send them to the data processing unit 222, which uses the new parameters of the measured crude oil fluid to calculate the flow rate of the measured crude oil fluid.

Figure 9:
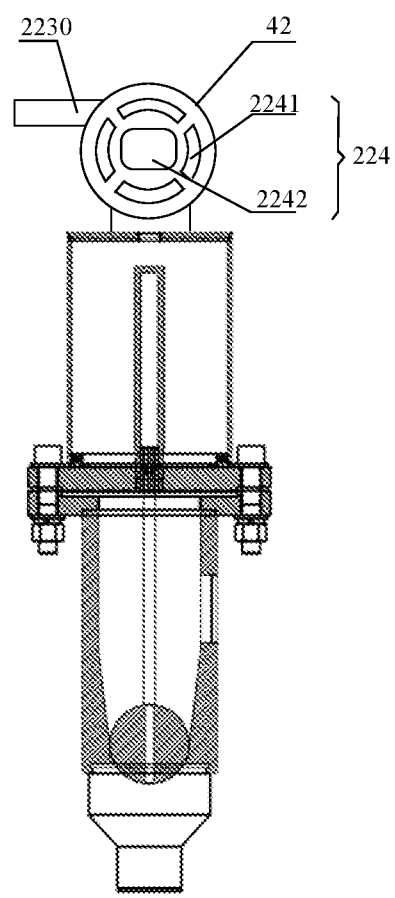
FIG. 9 is a schematic view of a partial structural of a crude oil flow metering device according to another embodiment of the present disclosure.

In addition, the processing module 22 in this embodiment may also include a human-computer interaction interface 224 composed of a display screen, keys, etc. As shown in FIG. 9, the processing module 222 is arranged in the gauge outfit 42, and the human-computer interaction interface 224 including keys 2241 and a display screen 2242 is provided outside the processing module 222. The display screen 2242 can display the instantaneous and cumulative flow rates and parameters of each option, and the keys 2241 can be used to select different options, modify the corresponding parameters, etc. For example, the various parameters used in formula 1-5 and formula 1-8 can be sent to the data processing unit 222 through the wireless transmission unit 223 in one implementation, and can be input through the human-computer interaction interface 224 by the work staff with authority in another implementation. The authority can be verified and confirmed by a set password. Of course, a touch screen can be used to implement the human-computer interaction interface 224.

In an embodiment, the processing module 22 may be composed of a microprocessor and corresponding peripheral circuits. An I/O interface of the microprocessor is connected to the signal interface of the sensor array 21 and the human-computer interaction interface 224, and is connected to the wireless module 223 such as Bluetooth, WiFi or ZigBee, so as to transmit the calculated flow rate data of the measured crude oil to a remote external device, with no need for the work staff to go to the measurement site to read the data.

Figure 10:
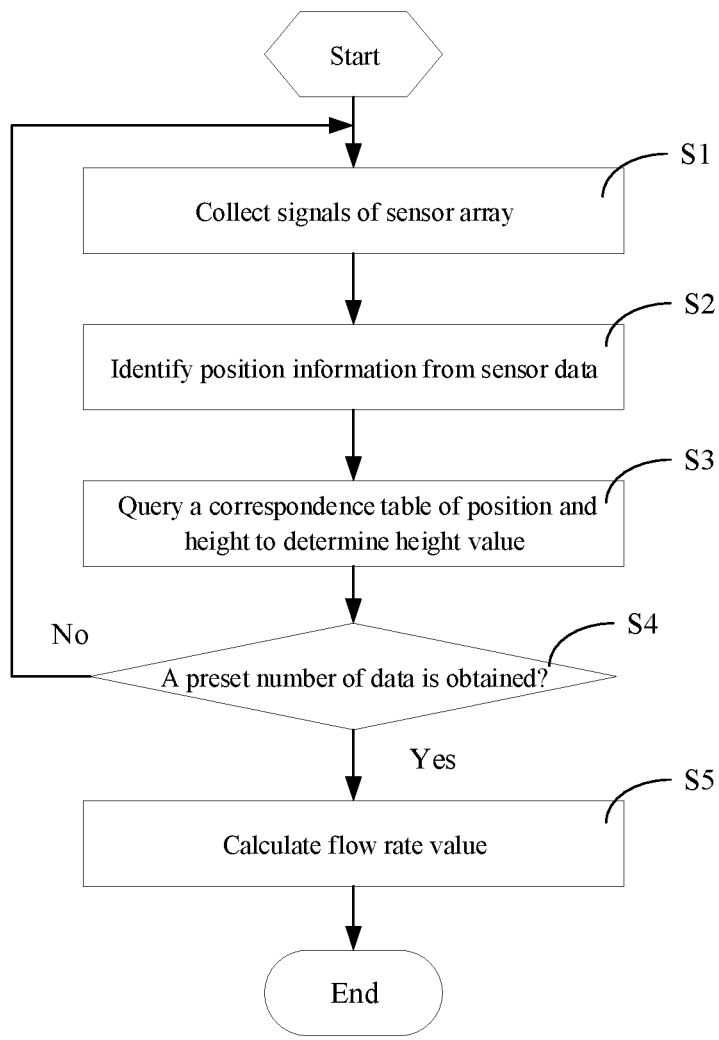
FIG. 10 is a flow chart of a flow metering method of a crude oil flow metering device according to an embodiment of the present disclosure.

FIG. 10 is a flow chart of a flow metering method according to an embodiment of the present disclosure. The method is based on the crude oil flow metering device described above, in which data is collected according to a preset data collection period, and the collected data is processed and calculated to obtain a flow rate value. The data processing frequency may be the same as the data collection frequency, or it may be a multiple of the data collection frequency. During data processing, only one data can be processed at a time, or multiple data can be processed at a time. For example, the data is collected once every second. During data processing, the data is processed once every 5 seconds, and 5 data are processed at a time. An average value of the flow rate based on 5 raw data is obtained during each processing. In the following, taking the data collection period of 1 second, the data processing period of 5 seconds, and the number of processed data of 5 each time as an example, the metering method of the present disclosure is described in detail as follows.

In step S1, signals of the sensor array are collected. Taking the crude oil flow metering device in FIG. 1 as an example, when the measured fluid enters the measuring tube from the liquid inlet at the bottom and flows out of the liquid outlet, the sphere float floats upward. Correspondingly, the magnet 123 at the end of the float connection rod 122 floats upward. During the upward movement of the magnet 123, the Hall sensors in the surrounding sensor array are affected by the magnetic field generated by the magnet 123 to generate electrical signals and form the sensor data. The sensor data includes position information and data information. The position information is the position of the sensor in the sensor array. The processing module 22 collects data from the signal output terminal of the sensor array 21 once every second to obtain one sensor data.

In step S2, the position information is recognized from the sensor data, and the position of the specific Hall sensor affected by the magnetic field of the magnet 123 is obtained through the position information.

In step S3, based on the position of the specific Hall sensor affected by the magnetic field of the magnet 123 obtained in step S2, the table of the correspondence between the sensor position and its height value stored in the processing module 22 is queried to determine the value of the upward floating height $\Delta h_i$ of the sphere float.

In step S4, it is judged whether a preset number of data is obtained, that is, it is judged whether 5 data are obtained in this embodiment. If there are 5 data currently, the flow rate value is calculated once in step S5, and one data processing process is completed. If a sufficient number of data are not obtained, the process returns to step S1.

There are two ways to calculate the flow rate value in step S5.

First way: According to each height value Δhi, formula 1-5 or 1-8 is used to calculate one flow rate value $q_{vi}$, and then an average value of 5 flow rate values $q_{vi}$ is calculated as the flow rate value of this calculation: $q_v = \Sigma_{i=1}^5 q_{vi}/5$.

Second way: A height average value is calculated firstly, $\Delta h = \Sigma_{i=1}^5 \Delta h_i/5$, and then the flow rate value $q_v$ is calculated according to formula 1-5 or 1-8.

The cumulative flow rate for a period of time is calculated according to formula 1-6 as required; for example, the cumulative flow rate is calculated once every day or every week, and is displayed on the display screen or sent to the external legal apparatus.

In another embodiment, the parameter Δh used in formula 1-5 or 1-8 can be determined through the following steps:
first, the position of the sensor that sends the data information in the sensor array is determined according to the position information in the sensor data;
then, the sensing distances d of a plurality of second sensors that have not sent the sensor data in the same first sensor array are determined according to the position of the sensor that sends the data information in the sensor array; and
then, the sensing distances d of the plurality of second sensors that have not sent the sensor data are subtracted from the total sensing distance $D_T$ of the first sensor array to obtain the corresponding height $\Delta h_i$ of the float at the current detection position.

Then, any of the calculation methods in the foregoing step S5 is performed to obtain the flow rate value.

The processing module 22 includes a memory, in which the calculated flow rate value is stored. The calculated flow rate value can be displayed on the display screen in real time, or it can be wirelessly transmitted to other remote devices at the same time for remote reading.

In the above embodiment, the connection rod sleeve 125 is in communication with the measuring tube 11, which together form a liquid cavity. The liquid cavity communicates with the outside only at the conduit 33 with a small communication area. Conventional sealing methods such as sealing strips, sealants are used to seal the conduit 33 to achieve a good sealing effect. Therefore, the position detection module adopts a sensor sleeve covering the outside of the connection rod sleeve 125, and the sensor arrays are arranged on the sensor sleeve, or the sensor arrays are directly distributed on the outer surface of the connection rod sleeve 125, so that a float height detection signal can be obtained. No transmission mechanism is required, and the connectionless signal detection method increases the reliability and accuracy of device detection.

The present disclosure can also detect the rising position of the float through an image capture device or a photoelectric sensor arranged in the detection cavity when in cooperation with a dividing ruler.

Figures 11A, 11B:
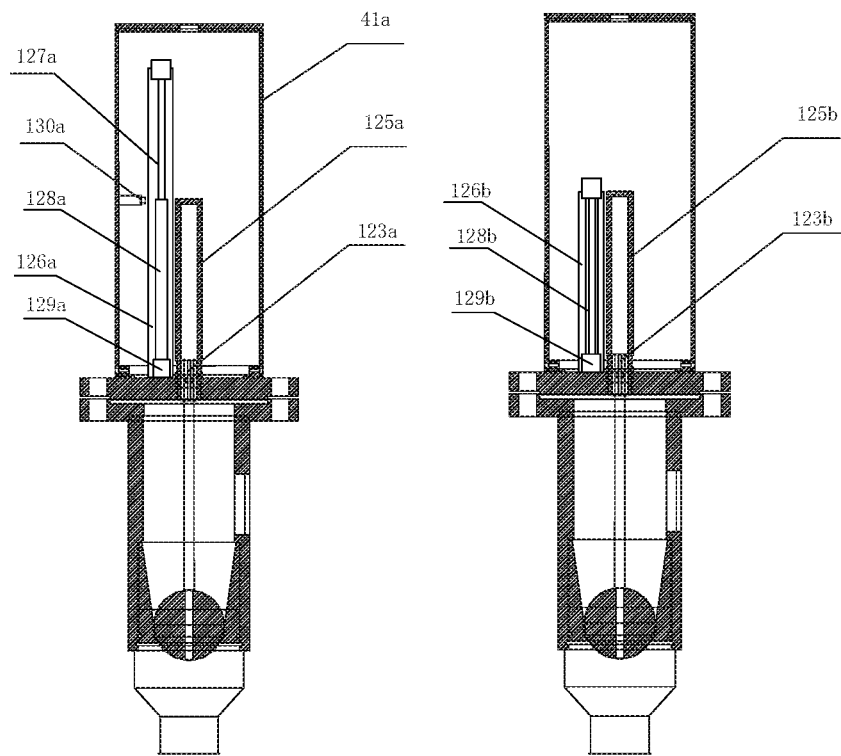
FIGS. 11A-11C are schematic views of partial structures of crude oil flow metering devices according to three other embodiments of the present disclosure.

As shown in FIG. 11A, a bracket 126a is provided outside of the connection rod sleeve 125a, and a slideway 127a is provided in the bracket 126a. A moving block 129a is provided at a position corresponding to the magnet 123a, and the moving block 129a is connected to a dividing ruler 128a. In an embodiment, the moving block 129a is an iron block. When the float rises in the measuring tube, the magnet 123a at its end rises and attracts the moving block 129a to rise together, and the dividing ruler 128a connected to the moving block 129a rises at the same time. Corresponding to the end of the connection rod sleeve 125a, an image capture device 130a, such as a camera, is installed on the housing 41a. Scales of the dividing ruler 128a are marked from top to bottom; that is, when the float is at the bottom, the top position of the dividing ruler 128a corresponding to the image capture device 130a is a starting position 0, and starting from 0 and going downward, the position of the moving block 129a is the maximum scale. When the float rises, the magnet 123a at its end attracts the moving block 129a to drive the dividing ruler 128a to rise, and the image capture device 130a collects the current image of the dividing ruler, so that the rising height of the float can be obtained through the image recognition of the processing module.

As shown in FIG. 11B, in this embodiment, a dividing ruler 128b is fixed to a bracket 126b, and the starting position of the dividing ruler 128b is at the lowermost moving block 129b. Moreover, its scales are represented by the depth. A photoelectric sensor is provided on the moving block 129b. When the moving block 129b rises with the magnet 123a, light emitted from a light emitter of the photoelectric sensor is irradiated onto the dividing ruler 128b, and a light receiver receives the light reflected back from the dividing ruler 128b, so that the current scale of the dividing ruler 128b is determined according to the change in the light energy of the received light signal.

In addition, other methods can also be used to realize the tracking movement of the moving blocks and the magnets. For example, Hall sensors and linear motors are provided on the moving blocks 129a and 129b. When the hall sensors sense the magnets 123a and 123b, the linear motors drive the dividing ruler 128a and the photoelectric sensor to follow the magnets 123a and 123b to move.

Figure 11C:
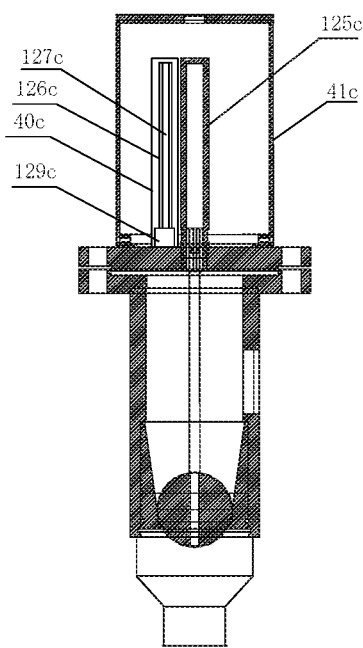
Figures 12A, 12B:
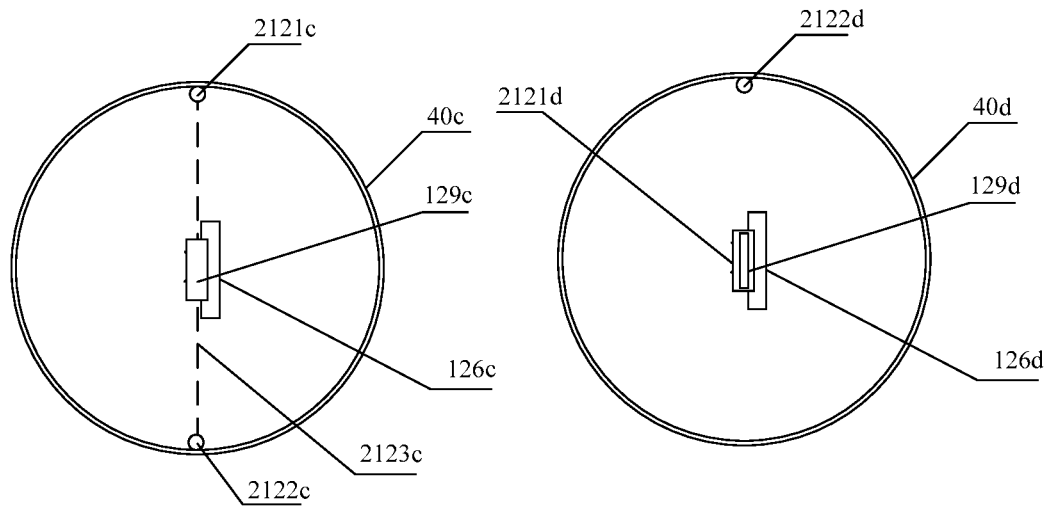
FIGS. 12A-12B are schematic views showing the arrangement of photoelectric sensors according to two other embodiments of the present disclosure.

As shown in FIG. 11C, in this embodiment, a sensor sleeve 40c is provided, which is sleeved outside a bracket 126c, a slideway 127c and a moving block 129c. In some other embodiments, there is no need to provide a dividing ruler on the bracket 126c, but a plurality of photoelectric sensors are provided on the sensor sleeve 40c to form a sensor array for determining the position. The section of the sensor sleeve 40c is shown in FIG. 12A. The sensor array is composed of a plurality of photoelectric sensors vertically arranged on an inner surface of a side surface of the sensor sleeve 40c. Each photoelectric sensor at a horizontal position includes a light emitting part 2121c and a light receiving part 2122c, both of which are fixed on the sensor sleeve 40c. A path 2123c formed by the light emitting part 2121c and the light receiving part 2122c intersects the up-and-down vertical movement path of the moving block 129c. The float connection rod moves up and down in the second sensor sleeve 125c, and drives the moving block 129c in the sensor sleeve 40c to move on the slideway 127c. When it blocks the path 2123c formed by the light emitting part 2121c and the light receiving part 2122c of one photoelectric sensor, the photoelectric sensor sends a signal. The position of the float connection rod can be determined according to the position of the photoelectric sensor that sends the signal, so that the rising height of the float when it rises from the lowest point to the detection position can be obtained.

In another embodiment, as shown in FIG. 12B, the sensor array on a sensor sleeve 40d is composed of light receiving parts 2122d of a plurality of photoelectric sensors, the plurality of light receiving parts 2122d are installed on an inner wall of the sensor sleeve 40d, and light emitting parts 2121d are installed on a moving block 129d. The light emitting parts 2121d always emit light. When the moving block 129d moves along the bracket 126d on the slideway, the light emitted from the light emitting parts 2121d can be received by the light receiving parts 2122d at different heights, and electrical signals can be sent. The position of the float connection rod can be determined according to the position of the photoelectric sensor that sends the electrical signal.

The processing module stores the table of correspondence between the sensor position and the height, and the processing module queries the table of correspondence according to the sensor position to obtain the rising height of the float, so that the flow rate of the measured crude oil can be calculated. For the specific process, reference may be made to the embodiment in which the Hall sensors are used as the sensor array, for which a detailed description will be omitted herein.

The above position detection module and the corresponding structure only reveal the relevant position detection means. Those skilled in the art can choose any of the above detection means as actually required, or obtain the relevant position detection structure under the teaching of the above detection means.

Figure 13:
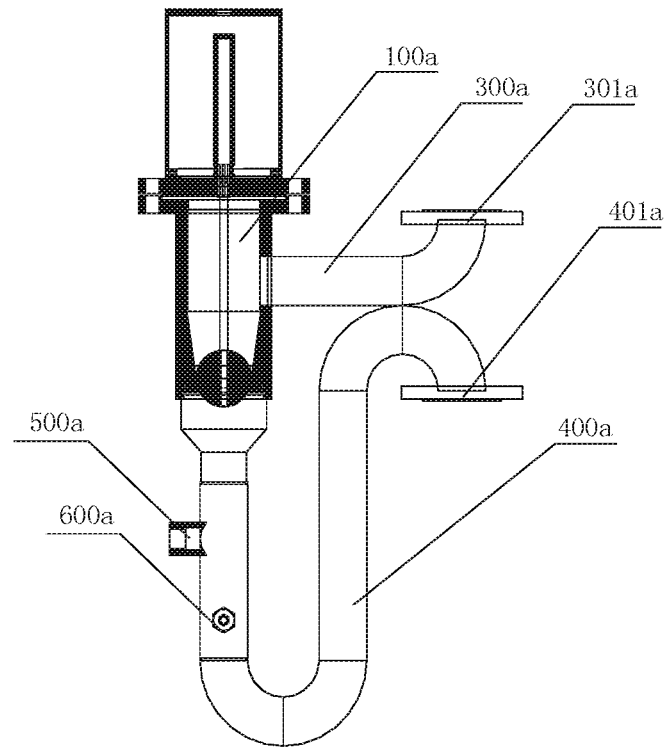
FIG. 13 is a schematic partial sectional view of an application embodiment of a crude oil flow metering device according to an embodiment of the present disclosure.

FIG. 13 is a schematic sectional view of an application embodiment of a crude oil flow metering device according to an embodiment of the present disclosure. In this embodiment, the liquid inlet of the crude oil flow metering device 100*a* is connected to a liquid inlet pipe 400*a*, which is an inverted S-shaped pipe. An end of the liquid inlet pipe 400*a* is connected with a flange 401*a* through an elbow so that the liquid inlet pipe 400*a* can be connected with a crude oil transport pipeline. The liquid inlet pipe 400*a* is connected with a plug-in water content detection device connection base 500*a* and a pressure sensor connection base 600*a*. The liquid outlet of the crude oil flow metering device 100*a* is connected to a liquid outlet pipe 300*a*. An end of the liquid outlet pipe 300*a* is connected with a flange 301*a* through an elbow so that the liquid outlet pipe 300*a* can be connected with the crude oil transport pipeline. In this application embodiment, the liquid inlet pipe and the liquid outlet pipe are added in the crude oil flow metering device, and the crude oil flow metering device can be connected with crude oil transport pipelines in various transport directions through the elbows at positions where the flanges are connected. As shown in the current figure, the installation directions of the crude oil transport pipelines and the crude oil flow metering device 100*a* are the same, that is, both are vertical. When the crude oil transport pipelines are in the horizontal direction, the elbows connected with the flanges 301*a* and 401*a* are rotated so that they can be respectively connected with the crude oil transport pipelines in the horizontal direction. After the crude oil is extracted, in addition to measuring the flow rate to calculate the yield, it is also usually necessary to measure the water content, pipeline pressure, etc. Since the crude oil flow metering device 100*a* is connected in series in the transport pipeline, the connection bases 500*a* and 600*a* of the water content detection device and the pressure sensor are connected to the liquid inlet pipe 400*a*, so that the water content detection device and the pressure sensor can be directly inserted into the connection bases when necessary, with no need to drill holes in the crude oil transport pipeline, which makes the installation simple. In addition, the processing module, the wireless connection module and the like in the crude oil flow metering device can receive the water content measured by the water content detection device and the pressure data measured by the pressure sensor, which can be displayed through the gauge outfit (not shown in the figure) or sent to a remote end.

Figure 14:
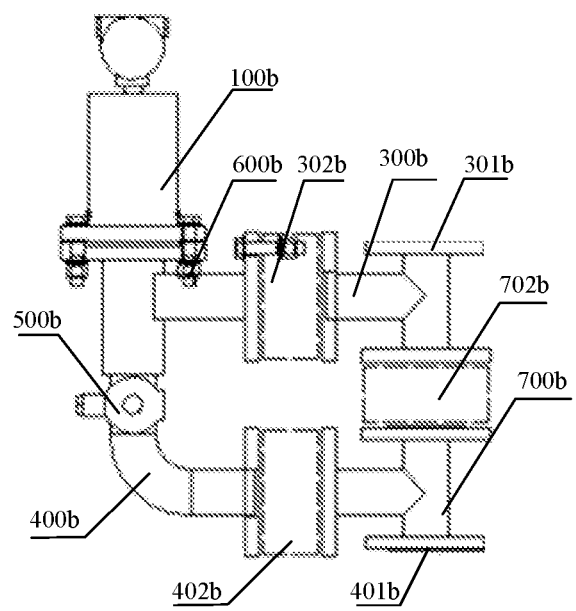
FIG. 14 is a schematic view of an application embodiment of a crude oil flow metering device according to another embodiment of the present disclosure.

FIG. 14 is a schematic view of another application embodiment of the crude oil flow metering device according to the present disclosure. In this embodiment, there are three pipelines 300*b*, 400*b* and 700*b* in total and valves 302*b*, 402*b* and 702*b* thereon. Flanges 401*b* and 301*b* are respectively connected to the lower crude oil transport pipeline and the upper crude oil transport pipeline. Similarly, the connection bases of the water content detection device and the pressure sensor can be provided on the pipelines to facilitate the connection of the water content detection device and the pressure sensor. In this embodiment, the water content detection device 500*b* and the pressure sensor 600*b* are already installed. The flanges 301*b* and 401*b* are respectively used to connect with the crude oil transport pipelines. In this embodiment, three pipelines and corresponding valves are provided, which can control whether the flow rate, water content, and pressure detection is required. If these parameters do not need to be measured and detected, the valves 302*b* and 402*b* are closed, and the valve 702*b* is opened. The crude oil in the lower crude oil transport pipeline flows into the upper crude oil transport pipeline through the pipeline 700*b*. If the flow rate, water content, and pressure detection is required, the valve 702*b* is closed, and the valves 302*b* and 402*b* are opened. The crude oil in the lower crude oil transport pipeline enters the crude oil flow metering device 100*b* through the pipeline 400*b*, and then flows into the upper crude oil transport pipeline through the pipeline 300*b*. During the flow of the crude oil, not only the flow rate is measured, but also the water content and the pressure are measured.

In summary, the crude oil flow metering device provided by the present disclosure can be separately connected to the crude oil transport pipeline to achieve flow rate metering, thus enabling long-time stable work and meeting the metering accuracy; and at the same time, the crude oil flow metering device can also be integrated with other detection devices to facilitate installation and daily maintenance.

The above embodiments are only for the purpose of illustrating the present disclosure, rather than limiting the present disclosure. Those skilled in the relevant technical field may make various changes and modifications without departing from the scope of the present disclosure. Therefore, all the equivalent technical solutions should also fall within the scope of the present disclosure.

What is claimed is:
1. A crude oil flow metering device, comprising:
a measuring part, which comprises:
  a measuring tube comprising a liquid inlet and a liquid outlet, an inner diameter of the measuring tube gradually increasing from the liquid inlet to the liquid outlet; and
  a float assembly, which is in-built in the measuring tube and comprises a float and a float connection rod integrally connected with the float, an end of the float connection rod being connected to a detection part; and
a metering part, which comprises:
  a position detection module, which is arranged in a detection cavity located above the measuring tube and formed by a first housing; in which when the detection part at the end of the float connection rod extends into the detection cavity, the position detection module detects a position of the detection part at the end of the float connection rod to obtain a float height detection signal;
  a connection rod sleeve, which is located in the detection cavity and is in communication with the measuring tube;
  a float stabilizing structure, which is connected to the end of the float connection rod, and which comprises a column and a plurality of side edges protruding from a side surface of the column in an axial direction of the column; and a processing module, which is connected to the position detection module to calculate a flow rate of measured crude oil according to the float height detection signal, wherein, when the float rises from a bottom end, the float connection rod and the float stabilizing structure extend into the connection rod sleeve.

2. The crude oil flow metering device according to claim 1, wherein the float is a sphere, and the processing module calculates the flow rate of the measured crude oil according to formula 1-5:

$$q_v = \alpha[\pi(R_f + \Delta h\sin(\theta/2))^2 - \pi R_f^2]\sqrt{2gV_f(\rho_f - \rho)/\rho\pi R_f^2}\,; \quad 1\text{-}5$$

where $q_v$ is a volumetric flow, $\alpha$ is a flow coefficient of the device, g is the acceleration of gravity, $V_f$ is a volume of the sphere float, $\rho_f$ is a density of the material of the sphere float, $\rho$ is a density of the measured crude oil, $\theta$ is a cone angle of the measuring tube, $\Delta h$ is a height of the sphere float from its lowest point to a current measurement position, and $R_f$ is a radius of the sphere float.

3. The crude oil flow metering device according to claim 1, wherein the measuring tube comprises a straight tube and an inverted cone-shaped tube that are sleeved together, and a cone angle of the cone-shaped tube is not larger than 20 degrees.

4. The crude oil flow metering device according to claim 1, wherein the float is a structural body which has a circular working cross section and which is symmetrical with respect to a vertical centerline, and the processing module calculates the flow rate of the measured crude oil according to formula 1-8:

$$q_v = \alpha[\pi(R_f + \Delta h\tan(\theta/2))^2 - \pi R_f^2]\sqrt{2gV_f(\rho_f - \rho)/\rho\pi R_f^2}\,; \quad 1\text{-}8$$

where $q_v$ is a volumetric flow, $\alpha$ is a flow coefficient of the device, g is the acceleration of gravity, $V_f$ is a volume of the float, $\rho_f$ is a density of the material of the float, $\rho$ is a density of the measured crude oil, $\theta$ is a cone angle of the measuring tube, $\Delta h$ is a height of the float from its lowest point to a current measurement position, and $R_f$ is a maximum working radius of the float.

5. The crude oil flow metering device according to claim 1, wherein the liquid inlet is located at a bottom of the measuring tube, and the liquid outlet is located on a side wall of the measuring tube.

6. The crude oil flow metering device according to claim 1, wherein the position detection module comprises an image capture device or a photoelectric sensor arranged in the detection cavity, and a dividing ruler configure to indicate a rising height of the float.

7. The crude oil flow metering device according to claim 1, wherein a gauge outfit which communicates with the first housing is installed on the first housing, and the processing module is located on the gauge outfit.

8. The crude oil flow metering device according to claim 1, wherein the measuring tube comprises a straight tube that is configured to match with inverted cone-shaped tubes with different cone angles.

9. The crude oil flow metering device according to claim 1, wherein the processing module comprises:

a data collection unit, which is connected to the position detection module and is configured to collect a detection signal output by the position detection module according to a preset collection period to obtain detection data;

a data processing unit, which is connected to the data collection unit and is configured to process the detection data and calculate the flow rate of the measured crude oil; and an output unit, which is connected to the data processing unit and is configured to output flow rate data of the measured crude oil.

10. The crude oil flow metering device according to claim 9, wherein the output unit is a human-computer interaction interface, and/or a wireless transmission module.

11. The crude oil flow metering device according to claim 1, wherein the position detection module is a sensor array, and when the detection part at the end of the float connection rod moves up and down in the detection cavity, sensors in the sensor array output the float height detection signal when they detect the detection part.

12. The crude oil flow metering device according to claim 11, wherein the sensor array is composed of a plurality of Hall sensors, which are arranged into a first array in an up-and-down vertical movement direction of the float connection rod, and the detection part at the end of the float connection rod is a magnet.

13. The crude oil flow metering device according to claim 11, wherein the sensor array is composed of a plurality of photoelectric sensors arranged on an inner surface of a side surface of a second sensor sleeve, and each of the photoelectric sensors corresponds to a unique detection position.

14. The crude oil flow metering device according to claim 11, wherein a detection signal output by the sensor array comprises position information and data information, and the position information is the position of the sensor that sends the data information in the sensor array.

15. A crude oil flow metering device, comprising:

a measuring part, which comprises:

a measuring tube comprising a liquid inlet and a liquid outlet, an inner diameter of the measuring tube gradually increasing from the liquid inlet to the liquid outlet; and a float assembly, which is in-built in the measuring tube and comprises a float and a float connection rod integrally connected with the float, an end of the float connection rod being connected to a detection part; and a metering part, which comprises:

a position detection module, which is arranged in a detection cavity located above the measuring tube and formed by a first housing: in which when the detection part at the end of the float connection rod extends into the detection cavity, the position detection module detects a position of the detection part at the end of the float connection rod to obtain a float height detection signal; and a processing module, which is connected to the position detection module to calculate a flow rate of measured crude oil according to the float height detection signal, wherein the position detection module is a sensor array, and when the detection part at the end of the float connection rod moves up and down in the detection cavity, sensors in the sensor array output the float height detection signal when they detect the detection part, wherein the sensor array is composed of a plurality of Hall sensors, which are arranged into a first array in an up-and-down vertical movement direction of the float connection rod, and the detection part at the end of the float connection rod is a magnet, and wherein there are a plurality of the first arrays, which are arranged in a spirally ascending manner on an outer surface of the first sensor sleeve in the up-and-down movement direction of the float connection rod, the float connection rod moves up and down in the first sensor sleeve, and each of the sensors corresponds to a unique detection position.

* * * * *